United States Patent

Cayet et al.

[11] Patent Number: 5,931,538
[45] Date of Patent: Aug. 3, 1999

[54] VEHICLE SEAT ELEMENT INCLUDING A COVER TENSIONED OVER A METAL FRAME

[75] Inventors: Alain Cayet, Versailles; Nicolas Michot, Chateaudun, both of France

[73] Assignee: Bertrand Faure Equipements S.A., Boulogne, France

[21] Appl. No.: 08/877,172

[22] Filed: Jun. 17, 1997

[30] Foreign Application Priority Data

Jun. 19, 1996 [FR] France .................................. 96 07627

[51] Int. Cl.⁶ .................................................. A47C 7/02
[52] U.S. Cl. ................................ 297/452.59; 297/218.1; 297/218.4; 297/218.3; 297/228.11; 297/229
[58] Field of Search ........................... 297/452.59, 218.1, 297/218.3, 218.4, 228.13, 219.1, 228.11, 229

[56] References Cited

U.S. PATENT DOCUMENTS

| 2,807,314 | 9/1957 | Larkin | 297/229 |
|---|---|---|---|
| 3,628,830 | 12/1971 | Mitjans | 297/219.1 |
| 3,995,892 | 12/1976 | Hellmann et al. | 297/452.59 X |
| 4,396,227 | 8/1983 | Neilson | 297/219.1 |
| 4,558,904 | 12/1985 | Schultz | 297/218.4 X |
| 4,732,097 | 3/1988 | Guilhem | 112/269.1 |
| 4,789,201 | 12/1988 | Selbert | 297/452.59 X |
| 4,815,789 | 3/1989 | Marcus | 297/218.1 X |
| 4,867,507 | 9/1989 | Arai | 297/452.59 X |
| 5,308,141 | 5/1994 | Robinson et al. | 297/218.4 |
| 5,338,091 | 8/1994 | Miller | 297/218.4 |
| 5,560,677 | 10/1996 | Cykana et al. | 297/218.3 |
| 5,601,333 | 2/1997 | Bostrom et al. | 297/218.1 X |
| 5,716,096 | 2/1998 | Pryde et al. | 297/228.1 |
| 5,718,478 | 2/1998 | Allison | 297/218.1 X |
| 5,768,758 | 6/1998 | Deignan et al. | 297/218.3 X |

FOREIGN PATENT DOCUMENTS

| 622579 | 6/1961 | Canada | 297/218.1 |
|---|---|---|---|
| 0 587 756 A1 | 5/1994 | European Pat. Off. | |
| 0 597 756 B1 | 5/1994 | European Pat. Off. | |
| 1 601 041 | 9/1970 | France | |
| 2562055 | 10/1985 | France | 292/452.59 |
| 2 590 284 | 5/1987 | France | |
| 2 060 367 | 5/1981 | United Kingdom | |
| WO 94/26655 | 11/1994 | WIPO | |

*Primary Examiner*—Peter M. Cuomo
*Assistant Examiner*—Rodney B. White
*Attorney, Agent, or Firm*—Marshall, O'Toole, Gerstein, Murray & Borun

[57] ABSTRACT

A vehicle seat element is covered by a cover having four lateral panels which are folded over a rigid frame. Two of the lateral panels that are opposite each other, present in the vicinity of their free edges buttonholes which are engaged on tabs that are free from sharp edges and that are secured to the rigid frame. An inextensible flexible cord is stitched along the free edges of the cover, between said free edges and the corresponding buttonholes.

9 Claims, 2 Drawing Sheets

VEHICLE SEAT ELEMENT INCLUDING A COVER TENSIONED OVER A METAL FRAME

FIELD OF THE INVENTION

The invention relates to vehicle seat elements comprising a cover tensioned over a metal frame.

BACKGROUND OF THE INVENTION

More particularly, the invention relates to a seat element presenting, externally:

a first main face for supporting a user of the seat;

a second main face at a distance from the first main face and separated from said first main face by a certain thickness; and four sides interconnecting the first and second main faces and defining the thickness of the seat element, said seat element including padding supported by metal reinforcement extending at least along the four sides of the seat element, and covered by a flexible outer cover, which cover presents, firstly a central zone forming the first main face of the seat element and secondly, first, second, third, and fourth lateral panels forming the sides of the seat element, at least the first and second lateral panels which correspond to two opposite sides of the seat element having respective free edges in the vicinity of which there are formed buttonholes, said buttonholes being engaged on fastening members referred to as "main" fastening members, which are secured to the reinforcement and which are disposed in the vicinity of the second main face of the seat element, thereby tensioning the cover over the padding and the reinforcement.

The term "buttonhole" is used broadly to designate any orifice formed through the cover and capable of receiving a fastener member for fixing the cover.

An example of a seat of that type is disclosed in document FR-A-1 601 041.

In the seat disclosed in that document, the free edges of the side panels of the cover form hems that contain a reinforcing cable, such that the free edges are expensive to make.

Also, the fastener members of the seat disclosed in the above-mentioned document are constituted by triangular spikes of sharp shape that can not only injure operators required to handle the frame of the seat proper during manufacture of the seat, and in particular when installing the cover, but can also tend to spoil the cover, particularly if the cover is made of a material that does not have very great stiffness or strength.

This damage to the cover by the fastener means can lead rather quickly to the cover being stretched, and that must be avoided at all costs.

To avoid that drawback, it is generally necessary:

firstly to avoid the use of certain materials for seat cover manufacture, when such materials are not strong enough to withstand attack by the fastener members in the form of triangular spikes; and secondly to use relatively stiff cables inserted in the above-mentioned hems to reinforce the free edges of the cover, or even to make use of rigid metal reinforcing rods.

The use of rigid rods or of cables gives rise firstly to a further increase in the cost of the cover, and secondly to the free edges of the cover being stiffened, which makes it considerably more difficult to put the cover into place during manufacture of the seat.

OBJECTS AND SUMMARY OF THE INVENTION

A particular object of the present invention is to mitigate the various drawbacks mentioned above.

To this end, the invention provides a seat of the kind in question wherein:

the free edge of each of the first and second lateral panels of the cover is reinforced by an inextensible flexible cord which has practically no stiffness against folding, said cord being fixed to the cover by means of stitching and extending substantially without folds along said free edge between the buttonholes of said free edge; and each main fastening member has no sharp edge liable to cut into the cover.

By means of these dispositions, the free edges of the side panels of the cover are sufficiently reinforced to withstand, effectively and in the long term, the traction forces induced by the cover fastener, given the way in which the fastener members of the cover are not aggressive.

In addition, the free edges of the cover remain flexible, thereby lending themselves well to the various kinds of handling required for putting the cover into place during manufacture of the seat.

In preferred embodiment, one or more of the following dispositions may optionally be used:

at least the first and second lateral panels of the cover are folded over the reinforcement and extend in part over the second main face of the seat element as far as the main fastening members;

the first, second, third, and fourth lateral panels of the cover extend continuously along three continuous sides of the seat element, the third and fourth lateral panels each presenting an end free edge that extends substantially along the thickness of the seat element and which is adjacent to the second lateral panel of the cover, each of the third and fourth lateral panels having a buttonhole in the vicinity of its end free edge, which end free edge is reinforced by an inextensible flexible cord which has practically no stiffness against folding, said cord being fixed to the cover by means of stitching and extending substantially without folds along said end free edge, between the corresponding buttonhole and said end free edge, said buttonhole being engaged on a fastening member, referred to as an "auxiliary" fastening member, which member is secured to the reinforcement and does not have any sharp edges liable to cut into the cover;

the free edge of the first lateral panel is reinforced by the same inextensible cord as are the end free edges of the third and fourth lateral panels, which cord runs along the first, third, and fourth lateral panels along the corresponding three sides of the seat element;

the auxiliary fastening members are disposed on the side of the seat element corresponding to the second lateral panel of the cover;

the inextensible cord is a textile cord;

the reinforcement is made at least in part out of sheet metal, the fastening members being constituted by tabs cut out in said reinforcement and being deburred;

each fastening member is constituted by a flat tab extending longitudinally from the reinforcement to an enlarged head of rounded shape; and for a seat element constituting a seat proper, the first and second main faces constitute respectively the top face and the bottom face of the seat proper.

BRIEF DESCRIPTION OF THE DRAWINGS

Other characteristics and advantages of the invention appear from the following detailed description of an embodiment, given by way of non-limiting example and with reference to the accompanying drawings.

In the drawings.

MORE DETAILED DESCRIPTION

Figure 1:
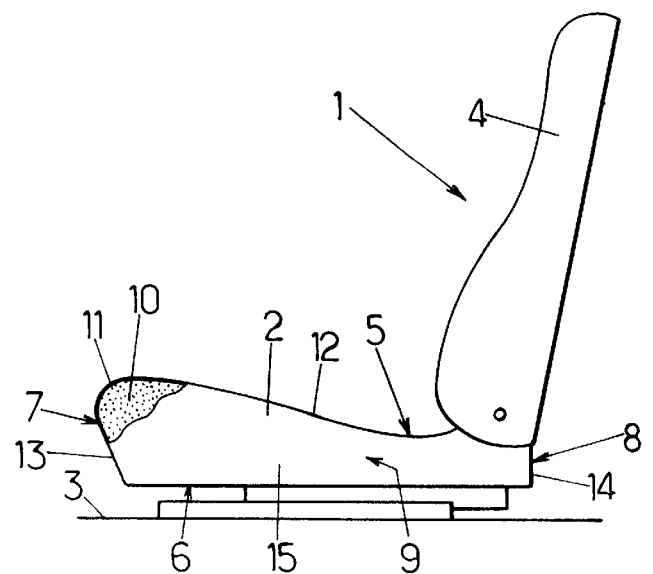
FIG. 1 is a diagrammatic overall view of a seat constituting an embodiment of the invention.

As shown in FIG. 1, the invention relates to a vehicle seat 1 which comprises firstly a seat proper 2 that is mounted on the floor 3 of the vehicle, and secondly a back 4 which is fixed to the seat proper.

The seat proper 2 presents:

a top face 5 on which the occupant of the seat sits;

a bottom face 6 that is separated from the top face 5 by a certain thickness; and four sides interconnecting the top and bottom faces 5 and 6 and defining the thickness of the seat proper, comprising specifically a front side 7, a back side 8, and two lateral sides 9.

The seat proper 2 includes padding which is generally constituted by a cushion of synthetic material covered by a cover 11 of flexible material, in particular woven cloth, knitted cloth, leather, synthetic material similar to leather, etc.

The cover 11 is made up of a central zone 12 which forms the top face 5 of the seat, and four lateral panels, namely:

a front lateral panel 13 forming the front side 7 of the seat;

a rear lateral panel 14 forming the rear side 8 of the seat; and two longitudinal lateral panels 15 forming the two longitudinal sides 9 of the seat.

Figure 2:
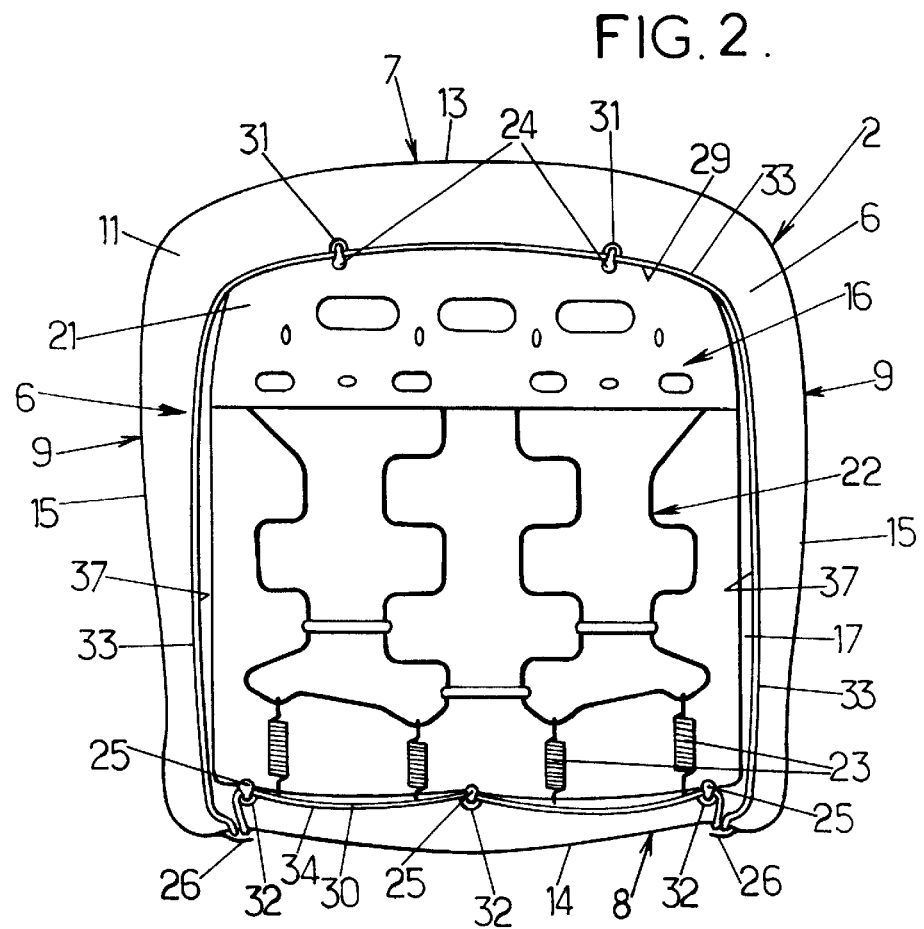
FIG. 2 is a diagrammatic view from beneath of the seat proper belonging to the FIG. 1 seat.
Figure 3:
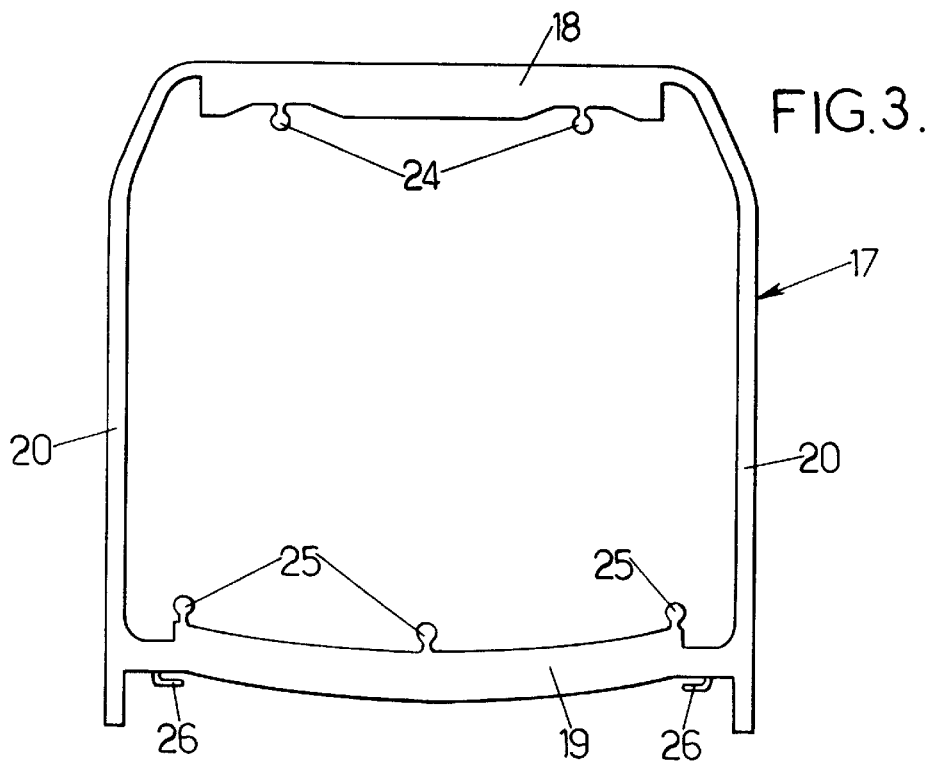
FIG. 3 is a diagrammatic view of the frame of the seat proper as shown in FIG. 2.

In addition, the padding 10 of the seat is supported by metal reinforcement 16 clearly visible in FIGS. 2 and 3 and disposed level with the bottom face 6 of the seat.

The reinforcement 16 comprises a rigid frame 17 extending along all four sides of the seat proper and including a front cross-member 18, a rear cross-member 19, and two longitudinal sills 20 (FIG. 3).

Inside the frame 17, the reinforcement 16 further includes, in the particular example shown in the drawings:

a rigid metal plate 21 fixed to the frame 17 in the vicinity of its front cross-member 18; and a horizontal sheet 22 of resilient metal wires secured firstly to the plate 21 and secondly tensioned by means of springs 23 themselves secured to the rear cross-member 19 (FIG. 2).

The rigid frame 17 is made of sheet metal, with the sheet metal being locally cut out so as to form fastening tabs for the cover (FIGS. 2 to 4), namely:

two fastening tabs 24 that extend rearwards from the front cross-member 18;

three fastening tabs 25 that extend forwards from the rear cross-member 19; and two fastening tabs 26 formed on the outside of the rear cross-member 19 in the vicinity of the two longitudinal sills 20 of the frame, said two tabs 26 being directed towards each other.

Each of the tabs 24, 25, and 26 is deburred after being cut out so as to avoid damaging the cover 11.

In addition, each of the tabs 24, 25, and 26 is rounded in shape, or is at least free from sharp angles, still for the purpose of avoiding damaging the cover 11.

Preferably, each of the tabs 24, 25, and 26 has firstly a length 27 (FIG. 4) that is relatively narrow extending from the frame 17, with the narrow length 27 being extended by an enlarged head 28 for a purpose explained below.

Figure 4:
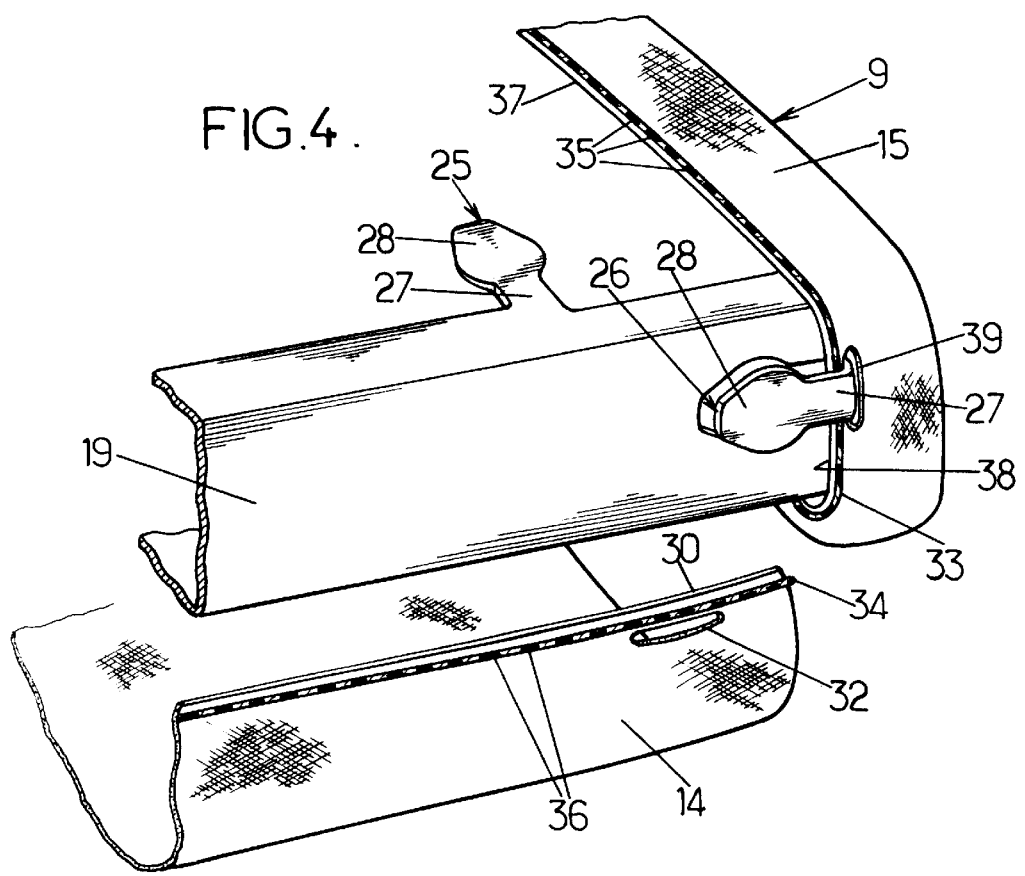
FIG. 4 is a detail view of the back of the seat proper as shown in FIG. 2.

As can be seen clearly in FIGS. 2 and 4, the front and rear lateral panels 13 and 14 of the cover are folded over the front and rear cross-members 18 and 19 of the frame respectively and extend parallel to the bottom face 6 of the seat, to free edges respectively referenced 29 and 30.

In the vicinity of these free edges 29 and 30, there are formed respective buttonholes 31 and 32 in which the tabs 24 and 25 are respectively engaged.

Because of this disposition, the central zone 12 of the cover is tensioned over the foam lining 10.

In order to reinforce the free edges 29 and 30 of the lateral panels 13 and 14 of the cover, two flexible inextensible cords 33 and 34 are fixed respectively along the free edges 29 and 30 by means of stitching given respective references 35 and 36. The cords extend substantially without folds along said free edges 29 and 30, between the buttonholes 31 and 32 and the free edges.

The inextensible flexible cords 33 and 34 can be textile cords, for example, and in particular they can be braided cords.

Preferably, the two longitudinal lateral panels 15 of the cover are made without discontinuity from the front lateral panel 13, and the cord 33 extends continuously not only along the free edge 29 of the front lateral panel 13, but also along the longitudinal free edges 37 of the two longitudinal lateral panels 15.

Also, the cord 33 extends likewise along a free edge 38 of each longitudinal lateral panel 15, which end free edge extends in the thickness direction of the seat proper in the vicinity of the rear lateral panel 14 of the cover.

Each of the longitudinal lateral panels 15 further includes, in the vicinity of its end free edge 38, a buttonhole 39 which is engaged on one of the fastening tabs 26, the flexible cord 33 being stitched between said buttonhole 39 and the end free edge 38.

In this way, the front portion of the cover of the seat 2 is tensioned rearwards against the "nose" of the seat proper.

Naturally, and as can be seen from the above, the invention is not limited to the particular embodiment described; on the contrary, it extends to any variant, and in particular to a variant in which the seat back 4 includes a cover fixed to the reinforcement of said back in a manner similar to that described for the cover on the seat proper, in which case the back face is covered by a sheet of plastics material or by some other form of mask.

We claim:

1. A seat element presenting, externally:

a first main face for supporting a user of the seat;

a second main face at a distance from the first main face and separated from said first main face by a certain thickness; and four sides interconnecting the first and second main faces and defining the thickness of the seat element, said seat element including padding supported by metal reinforcement extending at least along the four sides of the seat element, and covered by a flexible outer cover, which cover presents firstly a central zone forming the first main face of the seat element and secondly, first, second, third, and fourth lateral panels forming the sides of the seat element, at least the first and second lateral panels which correspond to two opposite sides of the seat element having buttonholes and respective free edges proximate to said buttonholes, said buttonholes being engaged on first fastening members which are secured to the reinforcement and which are disposed proximate to the second main face of the seat element, thereby tensioning the cover over the padding and the reinforcement, wherein the free edge of each of the first and second lateral panels of the cover is reinforced by an inextensible flexible cord which is easily foldable, said cord being directly stitched to the cover so as to be immovable relative to said cover, and said cord extending substantially without folds along said free edge between the buttonholes of said free edge; and and wherein each first fastening member is free of sharp edges that are liable to cut into the cover.

2. A seat element according to claim 1, in which at least the first and second lateral panels of the cover are folded over the reinforcement and extend in part over the second main face of the seat element as far as the first fastening members.

3. A seat element presenting, externally:

a first main face for supporting a user of the seat;

a second main face at a distance from the first main face and separated from said first main face by a certain thickness; and four sides interconnecting the first and second main faces and defining the thickness of the seat element, said seat element including padding supported by metal reinforcement extending at least along the four sides of the seat element, and covered by a flexible outer cover, which cover presents firstly a central zone forming the first main face of the seat element and secondly, first, second, third, and fourth lateral panels forming the sides of the seat element, at least the first and second lateral panels which correspond to two opposite sides of the seat element having buttonholes and respective free edges proximate to said buttonholes, said buttonholes being engaged on first fastening members which are secured to the reinforcement and which are disposed proximate to the second main face of the seat element, thereby tensioning the cover over the padding and the reinforcement, wherein the free edge of each of the first and second lateral panels of the cover is reinforced by an inextensible flexible cord which is easily foldable, said cord being fixed to the cover by means of stitching and extending substantially without folds along said free edge between the buttonholes of said free edge;

and wherein each first fastening member is free of sharp edges that are liable to cut into the cover; and in which the first, second, third, and fourth lateral panels of the cover extend continuously along three continuous sides of the seat element, the third and fourth lateral panels each presenting a further free edge that extends substantially along the thickness of the seat element and which is adjacent to the second lateral panel of the cover, each of the third and fourth lateral panels having a buttonhole proximate its further free edge, which further free edge is reinforced by an inextensible flexible cord which is easily foldable, said cord being fixed to the cover by means of stitching and extending substantially without folds along said further free edge, between the corresponding buttonhole and said further free edge, said buttonhole being engaged on a second fastening member which member is secured to the reinforcement and is free of sharp edges that are liable to cut into the cover.

4. A seat element according to claim 3, in which the free edge of the first lateral panel is reinforced by the same inextensible cord as are the further free edges of the third and fourth lateral panels, which cord runs along the first, third, and fourth lateral panels along the corresponding three sides of the seat element.

5. A seat element according to claim 3, in which the second fastening members are disposed on the side of the seat element corresponding to the second lateral panel of the cover.

6. A seat element according to claim 1, in which the inextensible cord is a textile cord.

7. A seat element presenting, externally:

a first main face for supporting a user of the seat;

a second main face at a distance from the first main face and separated from said first main face by a certain thickness; and four sides interconnecting the first and second main faces and defining the thickness of the seat element, said seat element including padding supported by metal reinforcement extending at least along the four sides of the seat element, and covered by a flexible outer cover, which cover presents firstly a central zone forming the first main face of the seat element and secondly, first, second, third, and fourth lateral panels forming the sides of the seat element, at least the first and second lateral panels which correspond to two opposite sides of the seat element having buttonholes and respective free edges proximate to said buttonholes, said buttonholes being engaged on first fastening members which are secured to the reinforcement and which are disposed proximate to the second main face of the seat element, thereby tensioning the cover over the padding and the reinforcement, wherein the free edge of each of the first and second lateral panels of the cover is reinforced by an inextensible flexible cord which is easily foldable, said cord being fixed to the cover by means of stitching and extending substantially without folds along said free edge between the buttonholes of said free edge;

and wherein each first fastening member is free of sharp edges that are liable to cut into the cover; and in which the reinforcement is made at least in part out of sheet metal, the first fastening members being constituted by tabs cut out in said reinforcement and being deburred.

8. A seat element according to claim 1, in which each first fastening member is constituted by a flat tab extending longitudinally from the reinforcement to an enlarged head of rounded shape.

9. A seat element according to claim 1, constituting a seat proper, the first and second main faces constituting respectively an upper horizontal face and a lower horizontal face of the seat proper.

* * * * *